July 9, 1935.  M. C. TERRY  2,007,730
REFRIGERATING APPARATUS
Filed Sept. 2, 1931
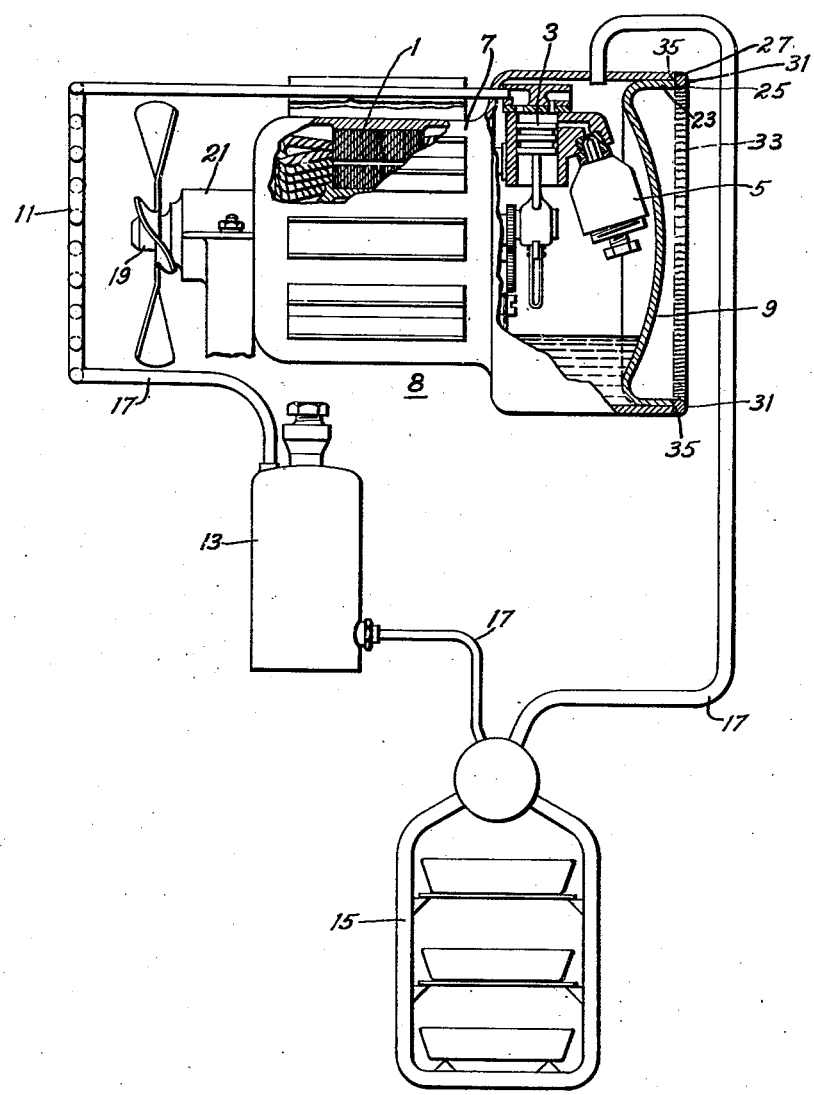
WITNESSES:
R. S. Williams
W. M. Van Sciver
INVENTOR
Matson C. Terry
BY
William F. Swezey
ATTORNEY Patented July 9, 1935

2,007,730

UNITED STATES PATENT OFFICE 2,007,730

REFRIGERATING APPARATUS

Matson C. Terry, Longmeadow, Mass., assignor to Westinghouse Electric & Manufacturing Company, a corporation of Pennsylvania Application September 2, 1931, Serial No. 560,689

4 Claims. (Cl. 230—58)

My invention relates to refrigerating apparatus, and particularly to refrigerating apparatus in which the motor and compressor are enclosed in a hermetically sealed casing.

Certain refrigerating systems include a motor and a compressor disposed in a hermetically sealed casing in order that the refrigerant in gaseous or liquid form does not escape. The ordinary method for sealing the casing is to provide a bolted end-plate and gaskets on the casing. Such a construction is provided so that the casing may be easily opened for repairs.

It is desirable, however, to provide a casing with an end plate entirely welded or brazed onto the casing, as the cost is less, and a hermetically sealed joint is ensured. It has been, however, necessary to cut off at least a portion of the casing and end-plate at the welded joint to gain access to the inside of the casing when repairs are to be made. The casing and end-plate are usually rendered worthless after being cut open and must be scrapped, and a new casing provided.

It is, therefore, an object of my invention to provide means whereby a refrigerator unit casing which is sealed by welding may be easily opened and rewelded several times without injury to the casing, and without the necessity of scrapping any parts thereof.

Other objects and advantages of my invention will become apparent from the following description and drawing, wherein:

The single figure is a view partly in section and partly in side elevation of a complete refrigerating system and shows a sealed casing for the motor and compressor constructed in accordance with an embodiment of my invention.

In order to provide means whereby a welded refrigerator motor and compressor casing may be opened and resealed several times without injury to the casing, a casing is provided having a cover provided with relatively long parallel portions adapted to fit adjacent to the main portion of the casing which is also preferably lengthened. The casing and cover are welded together at the ends of the casing and parallel portions of the cover. If it is desired to open the casing suitable means are utilized to cut off a small portion of the casing and the cover including the welded joint, and the casing is sealed again in the same manner as the first time.

Referring specifically to the drawing for a detailed description of my invention, the refrigerating apparatus includes a motor 1, a compressor 3 and an unloader valve 5 for the compressor, all contained in a sealed casing 8 which includes a main portion 7 and a cover 9. The refrigerating system also includes a condenser 11, a pressure-reducing valve 13 and an evaporator 15, connected together and to the casing 7 by suitable conduit 17. A fan 19 assists in cooling refrigerant in the condenser coils 11 and is driven by a motor mounted in the fan motor casing 21.

The cover plate 9 for the casing 8 is provided with a turned portion 23 of relatively great length and the ends 25 of the turned portion and the ends 27, of the portion of the casing 7, which are also lengthened, coincide. The entire turned portion 23 fits snugly into a portion of the casing 7. The ends 25 of the cover and the ends 27 of the casing are welded together at 31 after the motor compressor unit 1, 3 has been inserted.

The casing may be opened, if repairs are necessary, by a cutting machine severing the welded joint 31 along a line near the weld, as indicated by the dotted line 33. After repairs are made, the cover is replaced, as explained above, and the joint between the cover 9 and the portion of the casing 7 may again be welded as at point 35. The cover may be removed and replaced until the portion 23 is completely cut away without damage to the casing 8 or the cover plate 9.

It will be readily seen that I have provided means whereby the casing of a refrigerating unit sealed by welding may be easily opened and reclosed several times without material damage to the casing, and when reclosed is of sufficient mechanical strength to withstand the stresses it is subject to. It is understood that the word "welding" has been used illustratively and includes any other type of autogenous joining such as brazing.

Although I have shown and described a specific embodiment of my invention, it is understood that modifications and changes may be made therein without departing from the spirit and scope of the appended claims.

I claim as my invention:

1. In a motor compressor unit for a compression refrigerating system, the combination of a compressor, a motor for driving the compressor, a casing for enclosing said motor and compressor and for containing a refrigerant fluid to be translated by the compressor, said casing including two detachable portions, and structural means on the respective portions cooperating to provide an autogenous metal seal, said structural means being sufficiently extensive to form material for a second autogenous seal subsequent to removal of parts of said structural means, incident to detachment of one portion from the other.

2. In a motor compressor unit for a compression refrigerating system, the combination of a compressor, a motor for driving the compressor, a casing for enclosing said motor and compressor and for containing the refrigerant fluid to be translated by the compressor, said casing including two detachable portions, and structural means comprising overlapping edge portions provided on the respective casing portions and a circumferentially welded joint between the two overlapping edge portions, said overlapping edge portions being sufficiently extensive to form material for successive autogenous metal seals subsequent to removal of successive portions of an overlapping edge portion and joint, incident to successive detachment of the casing portions.

3. The process of servicing refrigerating apparatus of the hermetically sealed type wherein a compressor and a drive motor therefor are both enclosed in a casing embodying two detachable portions autogenously connected to each other by means of extended turned-out edge portions welded to each other near their extremities, which process comprises removing the welded marginal end portions of the two turned-out edge portions, detaching one portion of the casing from the other so as to provide access to the interior thereof, reassembling the two portions of the casing with their respective and partly removed extended edge portions in juxtaposed relation, and rewelding near the extremities of said turned-out edge portions so as to reestablish the hermetic quality of the casing.

4. The process of servicing refrigerating apparatus of the hermetically-sealed type wherein a compressor and a drive motor therefor are both enclosed in a casing embodying two detachable portions autogenously connected to each other by means of extended edge portions welded to each other near their extremities, which process comprises removing the welded marginal end portions of the two edge portions, detaching one portion of the casing from the other so as to provide access to the interior thereof, reassembling the two portions of the casing with their respective and partly removed extended edge portions in juxtaposed relation, and rewelding near the extremities of said edge portions so as to reestablish the hermetic quality of the casing.

MATSON C. TERRY.